UNITED STATES PATENT OFFICE.

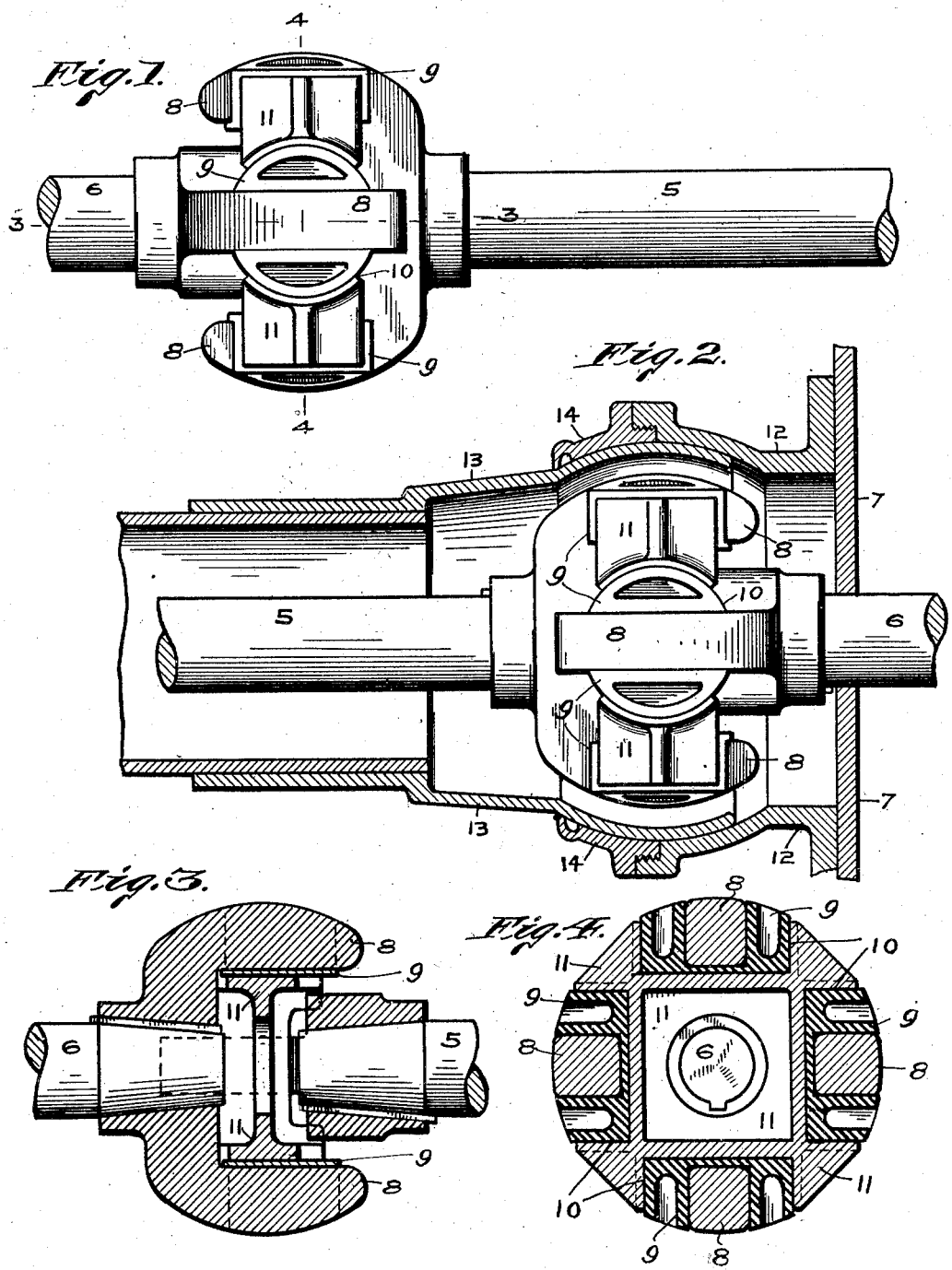

STANLEY WHITWORTH, OF INDIANAPOLIS, INDIANA, ASSIGNOR TO AMERICAN MOTORS COMPANY, OF INDIANAPOLIS, INDIANA, A CORPORATION OF INDIANA.

UNIVERSAL-JOINT COUPLING.

1,043,493.   Specification of Letters Patent.   Patented Nov. 5, 1912.

Application filed March 28, 1912. Serial No. 686,885.

*To all whom it may concern:*

Be it known that I, STANLEY WHITWORTH, a citizen of the United States, residing at Indianapolis, in the county of Marion and State of Indiana, have invented certain new and useful Improvements in Universal-Joint Couplings, of which the following is a specification.

This invention relates to a combined coupling and universal joint such as is used in the power transmission of automobiles and the like, and the object is to provide a universal joint and coupling to connect the ends of a transversely divided transmission shaft, whereby the movable parts will be self-centering so as to avoid all crank action and binding.

The object also is to provide a coupling joint with a sliding adjustment to compensate for variations in distance between the engine and the axle driven from it, and also to provide a joint which will be very strong and present a maximum bearing surface over which the strain and wear will be distributed, and to provide a joint which can be assembled and taken apart without the aid of tools.

I accomplish the objects of the invention by the mechanism illustrated in the accompanying drawing, in which—

Figure 1 is a side elevation of my invention detached from the housing in which it is ordinarily used. Fig. 2 is an elevation of the reverse side of the device shown in Fig. 1, and in this view the customary housing is shown in longitudinal section. Fig. 3 is a longitudinal section on the line 3—3 of Fig. 1 and Fig. 4 is a cross section on the line 4—4 of Fig. 1.

Like characters of reference indicate like parts throughout the several views of the drawing.

5 is an extension of a crank- or engine-shaft and 6 is a transversely divided portion thereof to be coupled thereto by means of my invention. The shaft member 6 enters the case 7 and connects with the usual differential gears (not shown). The case 7 and differential gears are supported by the rear axle of the machine while the engine is supported by the machine frame and has movement independently of the rear axle and differential gear, thereby throwing the shaft members 5 and 6 out of alinement, and varying the distance between the engine and axle. This necessitates a universal joint between shafts 5 and 6, and also requires a joint structure which is capable of expansion and contraction to suit the varying distances between the rear axle and the engine.

Keyed to the ends of each shaft 5 and 6 is a yoke having a pair of clutch-arms 8. The inner faces of the arms 8 are parallel with the longitudinal axis of their respective shafts and their side faces are parallel with each other. The yokes of the two shafts are assembled at right angles to each other in cylindrical bearing-blocks 9 which are diametrically slotted to receive the respective arms 8 with a sliding fit. The blocks 9 are seated in correspondingly shaped sockets 10, in a floating metal member 11, and have a rocking adjustment in said sockets by the rotation of the disalined shaft members 5 and 6. The arms 8 of the yokes slide longitudinally in the slotted bearing-blocks 9 to compensate for variations in distance between the rear axle and the engine under variable conditions of load, road, and speed. The cylindrical bearing-blocks 9 will preferably be made of bronze, and the remaining parts out of steel or iron.

My improved joint and the shaft members 5 and 6 are protected by a housing, as shown in Fig. 2, of which the member 12 is bolted to the case 7 and has an opposite socket-end to receive a ball-formation on the member 13, the two parts, when assembled, being retained by the socket-extension 14.

While I have shown and described my invention as applied to automobile transmission, it is applicable to other uses. I have also shown it as being embodied in certain precise forms and I do not desire to be limited thereto unduly or any more than is pointed out in the claims. On the contrary, I contemplate all proper changes in form, construction, and arrangement, the omission of immaterial elements and the substitution of equivalents, as circumstances may suggest or necessity render expedient, and I contemplate its application to all forms of mechanism to which it may be adapted.

I claim—

1. In a universal joint-coupling, a pair of yokes one on each shaft to be coupled, each of said yokes having a pair of arms the adjacent faces of which are parallel, said yokes being assembled with the planes of their arms at right angles to each other, blocks having slots to receive said arms, and a floating member having sockets in which said blocks are mounted and have a rocking adjustment.

2. In a universal joint-coupling, a pair of yokes one on each shaft to be coupled, each of said yokes having a pair of arms the adjacent faces of which are parallel, said yokes being assembled with the planes of their arms at right angles to each other, cylindrical bearing-blocks having diametrical slots to receive said arms with a sliding fit, and a floating member having sockets in which said cylindrical blocks are mounted and have a rocking adjustment.

3. The combination with a pair of shafts, of a universal joint-coupling to unite the ends of said shafts comprising a pair of yokes one on each shaft, each of said yokes having a pair of arms the adjacent faces of which are parallel, said yokes being assembled with the planes of their arms at right angles to each other, cylindrical bearing-blocks having diametrical slots to receive said arms with a sliding fit, a floating member having sockets in which said cylindrical blocks are mounted with a rocking adjustment, and a hollow housing surrounding both shafts and said coupling, said housing being in two parts, and a ball and socket joint connecting the two parts and concentric with the universal joint connecting the two shafts.

4. In a universal joint coupling, a pair of yokes one on each shaft to be coupled, each of said yokes having a pair of arms the adjacent faces of which are parallel, said yokes being asesmbled with the planes of their arms at right angles to each other, blocks having slots to receive said arms, a floating member having sockets in which said blocks are mounted and in which they have a rocking adjustment, and a housing with a ball and socket joint within which said joint-coupling is contained.

In witness whereof, I have hereunto set my hand and seal at Indianapolis, Indiana, this 25th day of March, A. D. one thousand nine hundred and twelve.

STANLEY WHITWORTH. [L. S.]

Witnesses:
J. A. MINTURN,
F. W. WOERNER.

Copies of this patent may be obtained for five cents each, by addressing the "Commissioner of Patents, Washington, D. C."